(12) United States Patent
Otsuka et al.

(10) Patent No.: US 10,670,397 B2
(45) Date of Patent: Jun. 2, 2020

(54) DISTANCE MEASURING DEVICE AND METHOD OF MEASURING DISTANCE BY USING THE SAME

(71) Applicant: SAMSUNG ELECTRONICS CO., LTD., Suwon-si (KR)

(72) Inventors: Tatsuhiro Otsuka, Suwon-si (KR); Jungwoo Kim, Hwaseong-si (KR); Heesun Yoon, Incheon (KR); Inoh Hwang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 224 days.

(21) Appl. No.: 15/821,071

(22) Filed: Nov. 22, 2017

(65) Prior Publication Data

US 2019/0011256 A1 Jan. 10, 2019

(30) Foreign Application Priority Data

Jul. 6, 2017 (KR) .................. 10-2017-0085926

(51) Int. Cl.
*G01V 8/00* (2006.01)
*G01C 15/00* (2006.01)
*G01C 3/08* (2006.01)

(52) U.S. Cl.
CPC .............. *G01C 15/002* (2013.01); *G01C 3/08* (2013.01)

(58) Field of Classification Search
CPC ........ G01C 3/08; G01C 15/002; G01B 11/00; G01B 11/026

USPC ..................................................... 250/559.38
See application file for complete search history.

(56) References Cited

U.S. PATENT DOCUMENTS

| 5,523,835 A * | 6/1996 | Tanaka ................... G01S 17/10 342/134 |
| 5,565,870 A | 10/1996 | Fukuhara et al. |
| 2005/0092896 A1* | 5/2005 | Ichino ............... H01L 31/02027 250/214.1 |
| 2006/0170903 A1* | 8/2006 | Aburmad ................ G01S 7/497 356/5.06 |
| 2010/0073221 A1* | 3/2010 | McEwan ................. G01S 7/285 342/175 |
| 2013/0049641 A1* | 2/2013 | Sheynblat ............ G01B 11/026 315/362 |
| 2013/0201490 A1* | 8/2013 | Iida ......................... G01S 17/48 356/614 |
| 2013/0242283 A1* | 9/2013 | Bailey ..................... G01S 17/89 356/4.01 |

(Continued)

FOREIGN PATENT DOCUMENTS

| JP | 2693427 B2 | 12/1997 |
| JP | 2016-205884 A | 12/2016 |
| KR | 10-2019-0000666 A | 1/2019 |

*Primary Examiner* — Georgia Y Epps
*Assistant Examiner* — Kevin Wyatt
(74) *Attorney, Agent, or Firm* — Sughrue Mion, PLLC (57) ABSTRACT

Provided is a distance measuring device and a method of measuring a distance. The distance measuring device detects light reflected by an object, generates an electrical signal based on the detected light, detects whether the electrical signal is saturated or not by comparing the electrical signal with a reference value, controls a magnitude of the electrical signal based on whether the signal is saturated, and calculates a distance to the object using the electrical signal.

19 Claims, 9 Drawing Sheets

(56) References Cited

U.S. PATENT DOCUMENTS

2014/0300887 A1* 10/2014 Yamamoto .............. G01S 17/08
                                                              356/5.01
2017/0097263 A1    4/2017  Williams
2018/0372848 A1   12/2018  Otsuka et al.

* cited by examiner

FIG. 9A —— $V_{bias} = -54V$

FIG. 9D

DISTANCE MEASURING DEVICE AND METHOD OF MEASURING DISTANCE BY USING THE SAME

CROSS-REFERENCE TO RELATED APPLICATION

This application claims priority from Korean Patent Application No. 10-2017-0085926, filed on Jul. 6, 2017, in the Korean Intellectual Property Office, the disclosure of which is incorporated herein in its entirety by reference.

BACKGROUND

1. Field

Apparatuses and methods consistent with exemplary embodiments relate to distance measuring devices for measuring a distance, and methods of measuring a distance by using the same.

2. Description of the Related Art

Recently, 3D cameras and light detection and ranging (LIDAR) techniques have been studied for measuring a distance to an object. One distance measuring method is a time of flight (TOF) method that measures the time required for light to travel between an object and a camera. Thus, the TOF method is used for measuring a distance between an image capturing device and an object, creating a depth image.

The TOF method includes processes of irradiating light of a specific wavelength, for example, a near-infrared ray (850 nm), onto an object, by using a light-emitting diode (LED) or a laser diode (LD); measuring or capturing an image of the light of the specific wavelength as reflected by the object by using a photodiode or a camera; and extracting a depth image from the measured or captured image. Various TOF methods have been developed utilizing optical processing, that is, a series of processes including light irradiation, reflection by the object, optical modulation, image capture, and processing. Discussions on methods of accurately measuring a distance to an object are ongoing.

SUMMARY

One or more exemplary embodiments may provide distance measuring devices configured to correctly measure a distance by using light, and methods of measuring the distance by using the distance measuring device.

Additional exemplary aspects will be set forth in part in the description which follows and, in part, will be apparent from the description, or may be learned by practice of the presented exemplary embodiments.

According to an aspect of an exemplary embodiment, a distance measuring device includes: a light-receiver configured to detect light reflected by an object and output an electrical signal based on the detected light; a peak detector configured to detect a peak from the electrical signal; a saturation detector configured to detect whether the electrical signal is saturated or not by comparing the electrical signal with a reference value and to output a saturation detection result; and a processor configured to measure a distance to the object by using the peak and to control a magnitude of the electrical signal by using at least one of a peak detection result, the saturation detection result, and a measured distance to the object.

The processor may decrease the magnitude of the electrical signal when the magnitude of the electrical signal is greater than a reference value.

The light receiver may include a light detector that detects light while a bias voltage is applied to the light detector.

The processor may control the magnitude of the electrical signal by controlling the bias voltage.

The magnitude of the electrical signal may be proportional to the magnitude of the bias voltage.

The light detector may include an avalanche photodiode (APD) or a single-photon avalanche diode (SPAD).

The light receiver may further include an amplifier that amplifies an amplitude of the electrical signal.

The processor may control the magnitude of the electrical signal by controlling a gain of the amplifier.

The distance measuring device may further include a light source configured to irradiate light onto the object.

The processor may control the electrical signal by controlling a driving signal of the light source.

The magnitude of the electrical signal may be proportional to a magnitude of the driving signal.

The processor may increase the magnitude of the electrical signal when the peak is not detected by the peak detector for a certain period of time.

The certain period of time may be greater than an emission frequency of light of the light source.

The peak detector may detect the peak by using a constant fraction discriminator (CFD) method.

The processor may control the magnitude of the electrical signal in proportion to a calculated distance.

According to an aspect of an another exemplary embodiment, a method of calculating a distance, the method includes: detecting light reflected by an object and outputting an electrical signal based on the detected light; detecting whether the electrical signal is saturated or not by comparing the electrical signal with a reference value and outputting a saturation detection result; controlling a magnitude of the electrical signal by using the saturation detection result; and calculating a distance to the object using the electrical signal.

The controlling of the electrical signal may include decreasing the electrical signal when the magnitude of the electrical signal is greater than the reference value.

The calculating of the distance may include calculating the distance to the object by detecting a peak from the electrical signal and increasing the magnitude of the electrical signal when the peak is not detected for a certain period of time.

The magnitude of the electrical signal may be controlled by controlling a magnitude of a bias voltage applied to a light detector that detects the light.

The magnitude of the electrical signal may be controlled by controlling a magnitude of a driving signal of a light source that emits light.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Reference will now be made in detail to embodiments, examples of which are illustrated in the accompanying drawings. In the drawings, widths and thicknesses of layers or regions may be exaggerated or reduced for clarity and convenience of explanation. Like reference numerals refer to like elements throughout.

Figure 1:
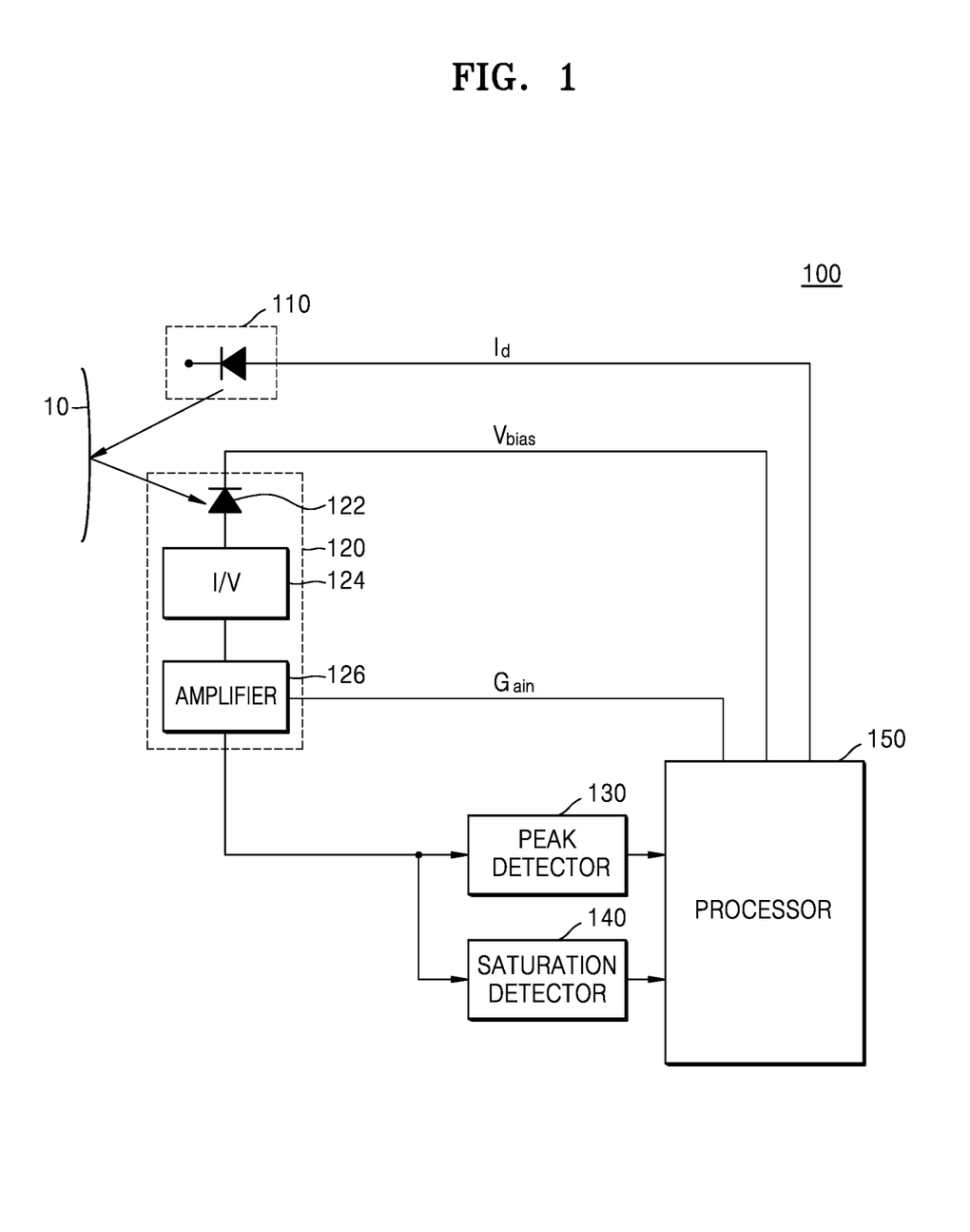
FIG. 1 is a block diagram of a distance measuring device according to an exemplary embodiment.

FIG. 1 is a block diagram of a distance measuring device 100 according to an exemplary embodiment. Referring to FIG. 1, the distance measuring device 100 may include a light source 110 configured to emit light toward an object 10, a light receiver 120 configured to detect the light reflected by the object 10 and convert the reflected light into an electrical signal, a peak detector 130 configured to detect a peak from the electrical signal, a saturation detector 140 configured to detect a saturation of the electrical signal by comparing the electrical signal with a reference value, and a processor 150 configured to calculate a distance to the object 10 by using the peak.

The light source 110 may be a light-emitting device. For example, the light source 110 may emit light having an infrared wavelength (hereinafter, infrared light). When a light source emitting infrared light is used, light from the light source may be distinguishable from natural, visible light such as sunlight. However, the light emitted from the light source 110 is not limited to emitting infrared light, and may alternately or additionally emit light in having any of various wavelengths. In this case, a correction may be used for removing information of mixed natural light. For example, the light source 110 may be a laser light source, but is not limited thereto. The light source 110 may be one of an edge emitting laser, a vertical-cavity surface emitting laser (VCSEL), and a distributed feedback laser. For example, the light source 110 may be a laser diode.

The light receiver 120 may convert light reflected or scattered by the object 10 to an electric signal, for example, a voltage. The light receiver 120 may include a light detector 122 configured to output an electrical signal, for example, a current corresponding to light, a current-voltage conversion circuit 124 that converts a current outputted from the light detector 122 into a voltage, and an amplifier 126 that amplifies the amplitude of the voltage. In addition to the above, the light receiver 120 may further include a lens that focuses light reflected by the object 10 and a filter, for example, a high-pass filter that filters an electrical signal of a specific frequency. The amplifier 126 may amplify the amplitude of the voltage, but the amplifier 126 is not limited thereto. The amplifier 126 may amplify the amplitude of the current when disposed between the light detector 122 and the current-voltage transformation circuit 124, or may be implemented as a single circuit together with the current-voltage transformation circuit 124.

The light detector 122 may be a light-receiving diode and may be operated in a state in which a bias voltage Vbias is applied thereto. For example, the light detector 122 may include an avalanche photo diode (APD) or a single photon avalanche diode (SPAD). The light detector 122 may be configured by a practical circuit in another way, for example, the light detector 122 may include an analog front end (AFE) or a time digital counter (TDC) depending on which one of the APD and the SPAD is included as a light-receiving diode in the light detector 122. The configuration of the practical circuitry of the light detector 122 may be a well-known technique in the art, and thus, a detailed description thereof is omitted.

The peak detector 130 may detect a peak from an electrical signal received from the light receiver 120. The peak detector 130 may detect a peak by detecting a central position of the electrical signal. Also, the peak detector 130 may detect a peak by analogically detecting a width of the electrical signal. The peak detector 130 may detect a peak by detecting a rising edge and a falling edge of a digital signal after converting the electrical signal to the digital signal. Also, after dividing an electrical signal into a plurality of signals and inverting and time-delaying some of the divided signals, the peak detector 130 may detect a peak by using a constant fraction discriminator (CFD) method in which a zero-crossing point is detected by combining the inverted and time-delayed signals and the remaining signals. A circuit that detects a peak by using the CFD may be referred to as a CFD circuit. The peak detector 130 may further include a comparator, and thus, may output the detected peak as a pulse signal.

The processor 150 may calculate a distance to the object 10 by using a peak detected by the peak detector 130. For example, the processor 150 may calculate a distance to the object 10 by using a time of the peak detected by the peak detector 130 and a time of light emitted from the light source 110. A method of measuring a distance by using a peak is a well-known technique in the art, and thus, a detailed description is omitted.

Figure 2A:
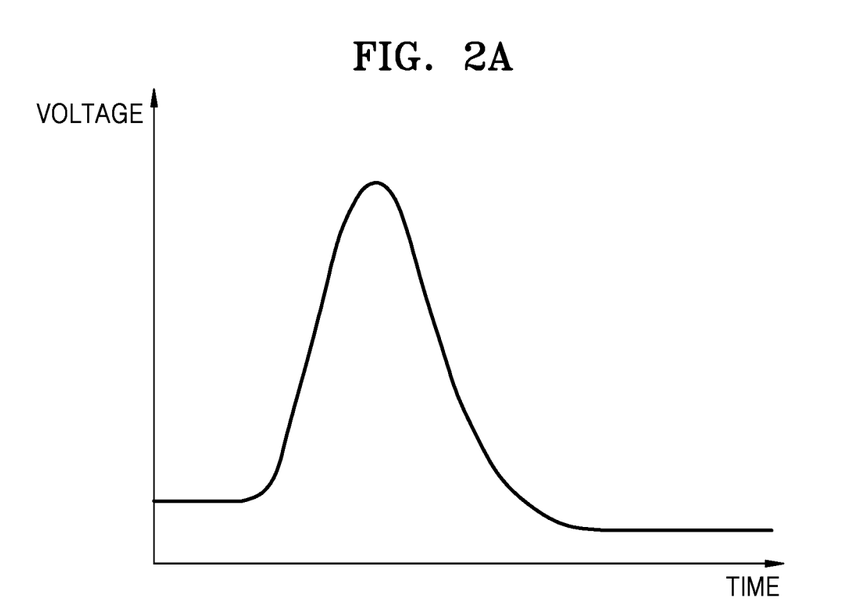
FIG. 2A is a graph showing an example of an unsaturated signal.
Figure 2B:
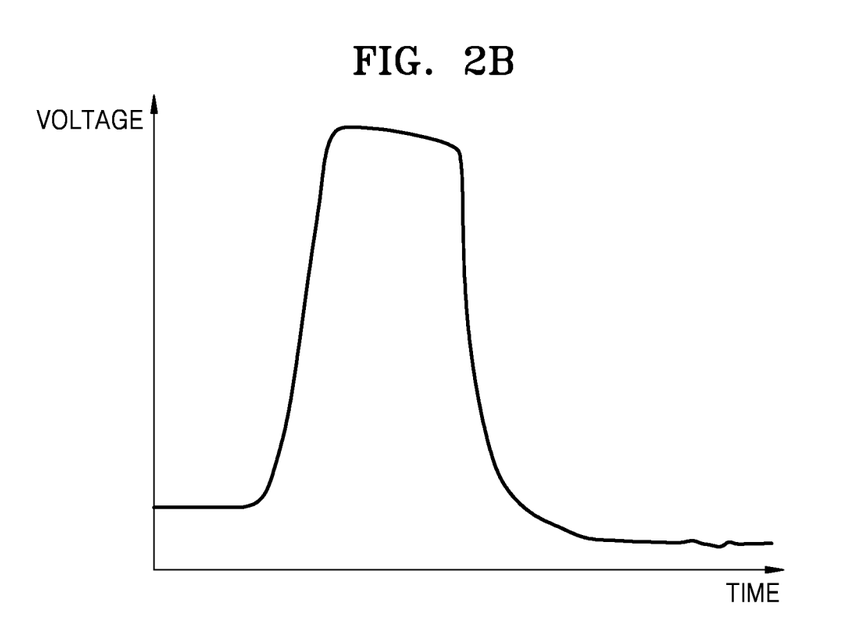
FIG. 2B is a graph showing an example of a saturated signal.

However, when light is irradiated onto a subject having a high refractive index or a subject located near the distance measuring device 100, the magnitude of the reflected light may exceed the dynamic range of the light receiver 120. Therefore, the light receiver 120 may output an electrical signal of a certain magnitude, that is, a saturated signal. FIG. 2A is a graph showing an example of an unsaturated signal. FIG. 2B is a graph showing an example of a saturated signal. As is evident, it is more difficult to obtain a peak from a saturated signal. When the light receiver 120 outputs a saturated signal, a certain amount of time is required to restore the original, unsaturated state of the signal, and thus, the light receiver 120 may output a signal having a characteristic different from that of the actual signal. Also, if the light receiver 120 outputs a saturated signal in some cases and outputs an unsaturated signal in other cases, an error may occur in detection of the peak.

The distance measuring device 100 according to the current embodiment may further include the saturation detector 140 that detects whether an electrical signal output from the light receiver 120 is saturated or not by comparing the electrical signal with a reference signal.

The saturation detector 140 may output an indication of a saturated signal, for example, "1", when an electrical signal is greater than a reference signal, and may output an indication of an unsaturated signal, for example, "0", when the electrical signal is smaller than the reference signal.

The processor 150 may control the magnitude of an electrical signal by using the indication output from the saturation detector 140. For example, the processor 150 may control the magnitude of an electrical signal by controlling the magnitude of a bias voltage Vbias applied to the light receiver 120, for example, to the light detector 122 of the light receiver 120. Also, the processor 150 may control the magnitude of an electrical signal by controlling the magnitude of a driving signal, for example, a driving current Id applied to the light source 110.

The bias voltage Vbias may be a potential difference applied to a power supply (not shown) as the light detector 122 is operated, and the magnitude of an electrical signal output from the light detector 122 may depend on the magnitude of detected light and may also depend on the magnitude of the bias voltage Vbias.

Figure 3:
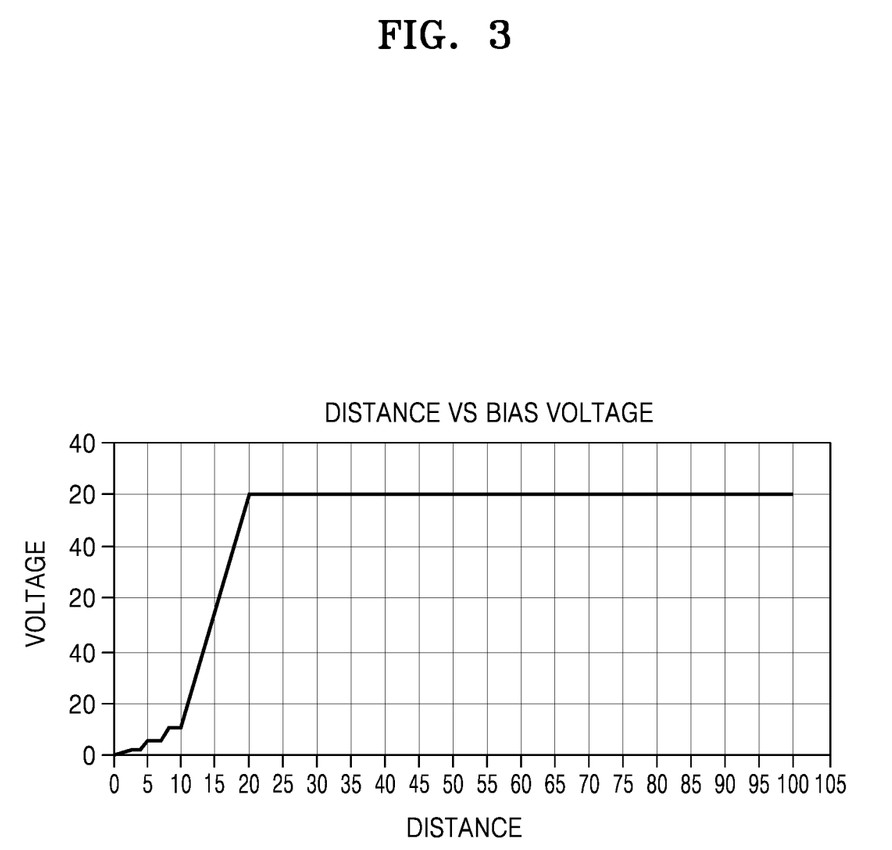
FIG. 3 is a graph showing an example of magnitude of a bias voltage applied to an object according to distances to the object.

The magnitude of the bias voltage Vbias may depend on the location of the object 10, the optical sensitivity of the light detector 122, and the power of the distance measuring device 100. FIG. 3 is a graph showing an example of a magnitude of the bias voltage Vbias applied to the light detector 122 according to the distance to the object 10. As depicted in FIG. 3, the processor 150 may change the magnitude of the a bias voltage Vbias being applied to the light detector 122 according to the distance to the object 10. For example, when the object 10 is located within a distance of about 20 meters, the processor 150 may correctly measure the distance by applying a bias voltage Vbias with a magnitude in proportion to the distance to the object 10. Also, when the object 10 is located at a distance of greater than 20 meters, the processor 150 may apply a maximum bias voltage Vbias, for example, 100 V, to the light detector 122. The bias voltage Vbias nay be changed according to the distance to the object 10, as described above, because the electrical signal output from the light detector 122 depends on the magnitude of the bias voltage Vbias. That is, when the magnitude of the bias voltage Vbias is small, the magnitude of the electrical signal output from the light detector 122 is small, and when the magnitude of the bias voltage Vbias is large, the magnitude of the electrical signal output from the light detector 122 is large. That is, the bias voltage Vbias controls the gain of the light detector 122.

When the object 10 is located near the light detector 122 or the object 10 has a large refractive index, the light receiver 120 may output an electrical signal that exceeds a dynamic range, that is, the light receiver 120 may output a saturated signal, and the saturation detector 140 may detect the saturation of the electrical signal by comparing the electrical signal with a reference value. For example, when the saturation detector 140 detects a saturated signal, the saturation detector 140 may output a high-level pulse signal. Then, the processor 150 may control the magnitude of the bias voltage Vbias to be small. Thus, the light receiver 120 may output a signal having a small magnitude, that is, an unsaturated signal. For example, the processor 150 may control the magnitude of the bias voltage Vbias to be smaller than 70% of the magnitude before being controlled.

Also, the processor 150 may control the magnitude of the electrical signal by controlling the magnitude of a driving signal, for example, a driving current Id of the light source 110. The magnitude of light reflected by the object 10 may be proportional to a refractive index of the object 10 and also proportional to the magnitude of light emitted from the light source 110. An electrical signal output from the light detector 122 may be proportional to the magnitude of light received by the light detector 122. Thus, the magnitude of an electrical signal output from the light detector 122 may be proportional to the magnitude of the driving signal of the light source 110. When the processor 150 receives a saturation signal from the saturation detector 140, the processor 150 may control the magnitude of the driving signal of the light source 110 to be small. Then, light having a small magnitude may be irradiated onto the object 10, and accordingly, the magnitude of reflected light may also be small. Therefore, the magnitude of the electrical signal output from the light detector 122 becomes small, and thus, the light receiver 120 may output an unsaturated electrical signal. For example, the processor 150 may reduce the magnitude of the driving signal to be smaller than 70% of the magnitude before being controlled.

Also, the processor 150 may control the magnitude of the electrical signal by controlling a gain of the amplifier 126. The magnitude of an electrical signal output from the light receiver 120 may be proportional to a gain of the amplifier 126. Accordingly, when the processor 150 receives a saturation signal from the light receiver 120, the processor 150 may control the magnitude of the gain with respect to the amplifier 126 to be small.

When the processor 150 receives an unsaturated signal, for example, a low-level signal from the saturation detector 140, the processor 150 may omit additional control of the magnitude of the electrical signal. However, the current exemplary embodiment is not limited thereto. The processor 150 may also appropriately control the magnitude of the electrical signal according to a measured distance. That is, although the processor 150 receives an unsaturated signal from the saturation detector 140, the processor 150 may control the magnitude of the electrical signal in proportion to the measured distance. For example, if the measured distance is smaller than a previously measured distance, the processor 150 may control the magnitude of the electrical signal to be small, and if the measured distance is larger than the previously measured distance, the processor 150 may control the magnitude of the electrical signal to be large. A control range of the magnitude of an electrical signal described above may be based on a look-up table that shows a relationship between distance and the magnitude of the electrical signal. The peak detector 130 may not detect a peak from an electrical signal for a certain period of time. Here, the certain period of time may be greater than a frequency of light emission from the light source 110. For example, the certain period of time may be about two to three times greater than the frequency of light emission from the light source 110. If the magnitude of an electrical signal output from the light receiver 120 is too small, the peak detector 130 may detect a peak. Then, the processor 150 may control the magnitude of an electrical signal to be large. The processor 150 may control the magnitude of the electrical signal by controlling the magnitude of the bias voltage Vbias applied to the light receiver 120, for example, the light detector 122, to be large. For example, the processor 150 may control the magnitude of the bias voltage Vbias to be 130% of the magnitude before controlling. When the magnitude of a bias voltage Vbias is large, the magnitude of an electrical signal output from the light receiver 120 may also be large.

Also, the processor 150 may control the magnitude of the electrical signal by controlling the magnitude of a driving signal, for example, the driving current Id of the light source 110. For example, the processor 150 may control the magnitude of the driving signal to be greater than 130% of the magnitude of the driving signal applied to the processor 150.

If the driving signal is large, the magnitude of light emitted from the light source 110 is large, and the magnitude of light reflected by the object 10 becomes large. Also, the light receiver 120 may output an electrical signal having a large magnitude, and the peak detector 130 may detect a peak from the received electrical signal.

Also, the processor 150 may control the magnitude of the electrical signal to be large by controlling the magnitude of a gain of the amplifier 126 to be large.

Figure 4:
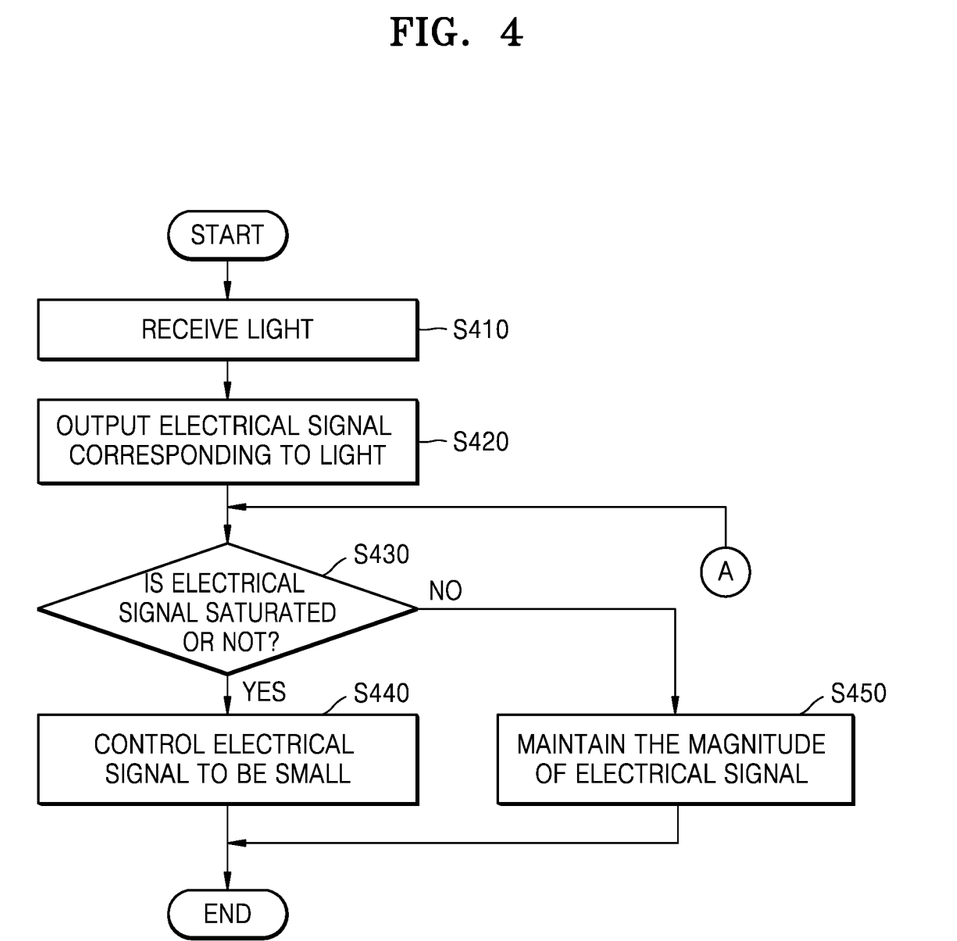
FIGS. 4 and 5 are each a flowchart of a method of operating a distance measuring device 100, according to exemplary embodiments.
Figure 5:
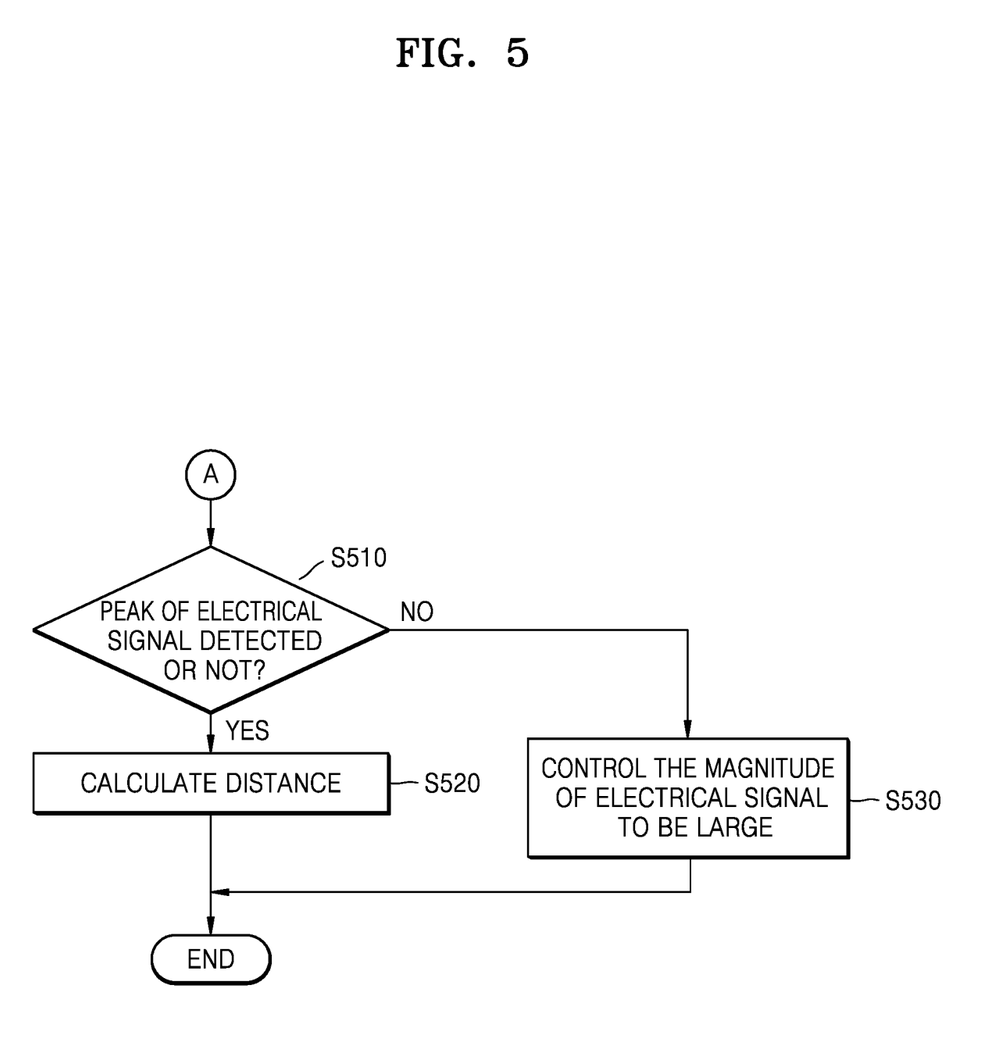

FIGS. 4 and 5 are each a flowchart of a method of operating a distance measuring device 100, according to an exemplary embodiment. FIGS. 6A, 6B, 6C, 6D, and 6E are diagrams for explaining a wavelength of a signal of a distance measuring device 100, according to an exemplary embodiment of the inventive concept.

Figure 6A:
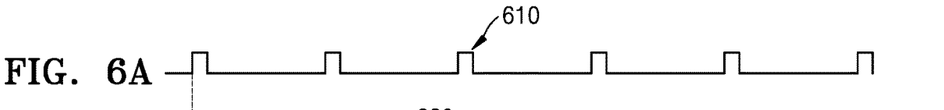
FIGS. 6A, 6B, 6C, 6D, and 6E are diagrams for explaining a wavelength of a signal of a distance measuring device, according to an exemplary embodiment.

Referring to FIG. 4, the light receiver 120 receives light reflected by the object 10. The light source 110 may emit light with a certain time interval to the object 10 (S410). As depicted in FIG. 6A, the light source 110 may emit light, for example, a laser pulse 610, at a certain time interval. The light emitted from the light source 110 is reflected by the object 10, and a portion of the reflected light may be received by the light receiver 120. The light source 110 may be one of an edge emitting laser, a VCSEL, and a distributed feedback laser. For example, the light source 110 may be a laser diode.

Figure 6B:
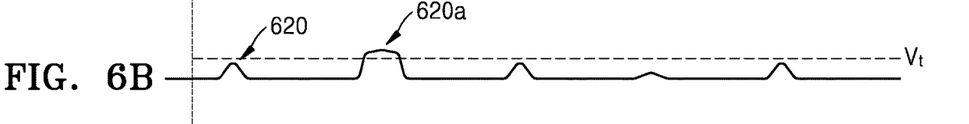
Figure 6C:
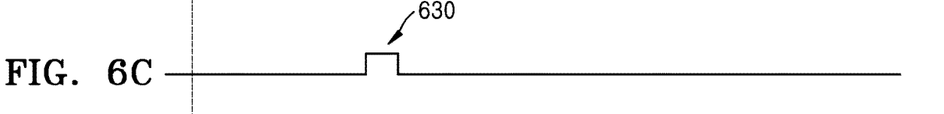

The light receiver 120 may convert light reflected or scattered by the object 10 into an electrical signal, for example, a voltage, and may output the electrical signal (S420). Light reflected by the object 10 may be focused on a lens, and the light detector 122 may output a current corresponding to the focused light. Also, the current-voltage transformation circuit 124 may output a voltage by converting the current to the voltage. The light receiver 120 may output an electrical signal 620 as depicted in FIG. 6B. The light detector 122 may be a light-receiving diode, and may be operated in a state in which a bias voltage Vbias is applied thereto. For example, the light detector 122 may include an APD or a SPAD.

The saturation detector 140 may detect whether an electrical signal output by the light receiver 120 is saturated or not (S430). A portion of the electrical signal output by the light receiver 120 is applied to the saturation detector 140, and a remaining portion of the electrical signal may be applied to the peak detector 130. The saturation detector 140 may output a pulse wave as an indication of whether the electrical signal is saturated or not, by comparing the electrical signal with a reference value. Vt depicted in FIG. 6B may be a reference value. When an electrical signal 620a greater than the reference value is detected, the saturation detector 140 may, as depicted FIG. 6C, output a saturated signal 630, for example, a high-level pulse signal 630.

Figure 6D:
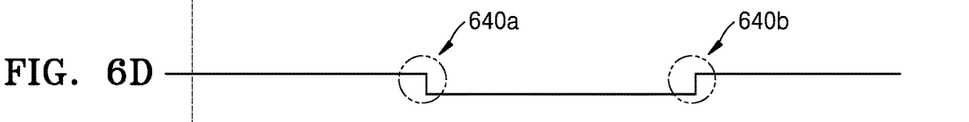

When the electrical signal is determined to be saturated (S430-Y), the processor 150 may control the magnitude of an electrical signal to be small (S440). The processor 150 may control the magnitude of an electrical signal by controlling the magnitude of exemplary bias voltage applied to the light receiver 120, for example, the light detector 122. of the graph of FIG. 6D shows a waveform of a bias voltage. When a saturated signal 630 is detected, the processor 150 may control the magnitude of the bias voltage to be small, but the processor 150 is not limited thereto. The processor 150 may also control the driving signal of the light source 110 to be small.

When the electrical signal is determined to be unsaturated (S430-N), the processor 150 may maintain the magnitude of the electrical signal (S450), but the processor 150 is not limited thereto. The processor 150 may also appropriately control the magnitude of the electrical signal according to a measured distance to the object 10.

Figure 6E:
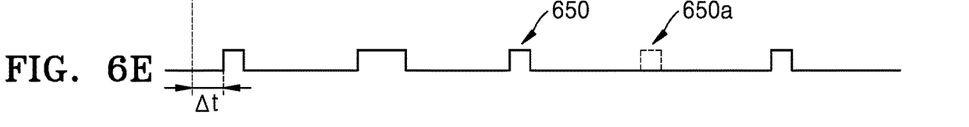

Referring to FIG. 5, the peak detector 130 may detect a peak from an electrical signal output from the light receiver 120 (S510). The peak detector 130 may detect a peak by detecting the central position of an electrical signal. Also, the peak detector 130 may analogically detect a peak by detecting a width of an electrical signal. Also, the peak detector 130 may detect a peak by detecting a rising edge or a falling edge of a digital signal after converting an electrical signal to the digital signal. The peak detector 130 may detect a peak by using a CFD method, and may output the detected peak as a digital signal by using a comparator. of the graph of FIG. 6E shows a waveform of a signal output from the peak detector 130. When a peak is detected, as a result, the peak detector 130 may output, for example, a high-level pulse 650.

When a peak is detected (S510-Y), the processor 150 may measure a distance to the object 10 by using a peak detection time (S520). For example, the processor 150 may measure a distance to the object 10 by using a time difference between a peak detection time and a light emission time. The method of measurement by using a peak is well known in the art, and thus, a detailed description thereof is omitted.

When a peak is not detected (S510-N), the processor 150 may control the magnitude of an electrical signal (S530). When a peak is not detected for a certain period of time, the processor 150 may determine that the magnitude of an electrical signal is small, and thus, may control the magnitude of an electrical signal to be large. Here, the certain period of time may be greater than a frequency of light emitted from the light source 110, for example, may be about two to three times greater than a driving frequency of light.

If a peak is not detected in a state in which the location etc. of the object 10 is not changed, this may be the reason that the magnitude of the bias voltage Vbias is too small. Accordingly, the processor 150 may control the magnitude of the electrical signal by controlling the magnitude of the bias voltage Vbias to be large. If a peak 650a is not detected in FIG. 6E, the processor 150 may control a magnitude 640b of the bias voltage Vbias to be large, as shown by the signal waveform of FIG. 6D, but the processor 150 is not limited thereto. The processor 150 may control the driving signal of the light source 110 to be large.

FIGS. 7A, 7B, 7C, 7D, and 7E are diagrams of a waveform of a signal that controls a driving signal of the light source 110 according to saturation detection, according to an exemplary embodiment.

Figure 7A:
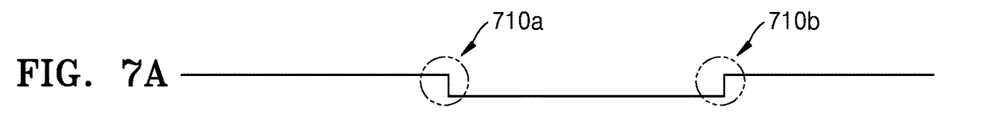
FIGS. 7A, 7B, 7C, 7D, and 7E are diagrams of a waveform of a signal that controls a driving signal of a light source according to saturation detection, according to an exemplary embodiment.
Figure 7B:
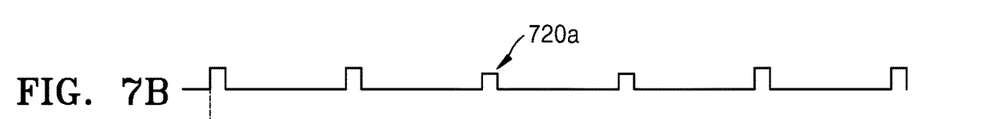
Figure 7C:
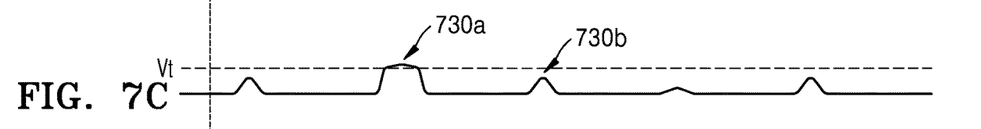
Figure 7D:
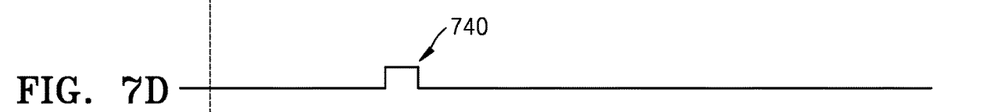
Figure 7E:
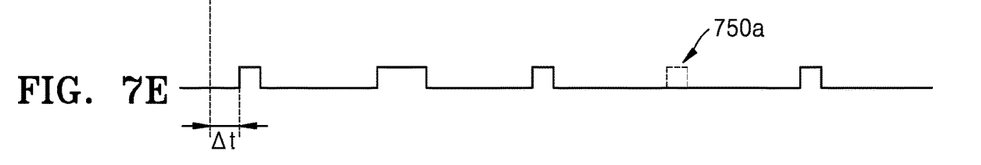

When the saturation detector 140 detects a saturated signal 730a depicted in FIG. 7C, the processor 150 may, as depicted in FIG. 7A, control a magnitude 710a of the driving signal of the light source 110 to be small. Thus, as depicted in FIG. 7B, the magnitude of light emitted from the light source 110 becomes small. Thus, the light receiver 120 may output an electrical signal 730b having a small magnitude due to the light, the magnitude of which is reduced. Meanwhile, as depicted in FIG. 7E, if a peak 750a is not detected by the peak detector 130 for a certain period of time, the processor 150 may re-control a magnitude 710b of the driving signal of the light source 110 to be large. For example, the processor 150 may control the magnitude of the driving signal to be the original magnitude.

Figure 8A:
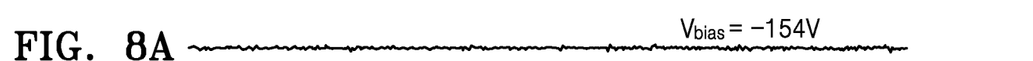
FIGS. 8A, 8B, 8C, 8D, 9A, 9B, 9C, and 9D are diagrams showing results of simulations of peak detections according to bias voltages.
Figure 8B:
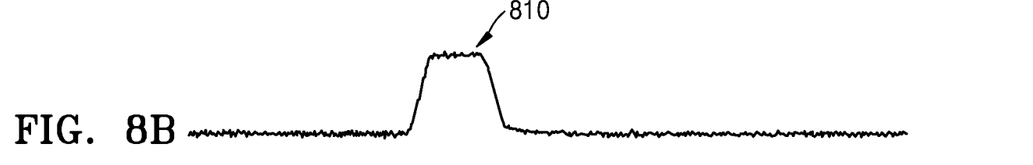
Figure 8C:
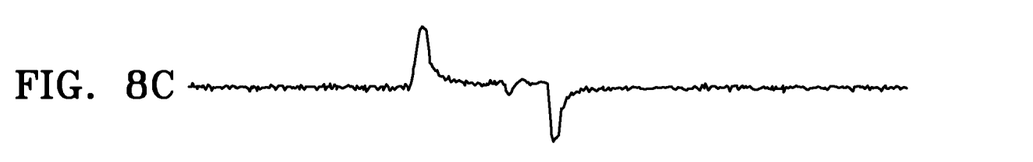
Figure 8D:
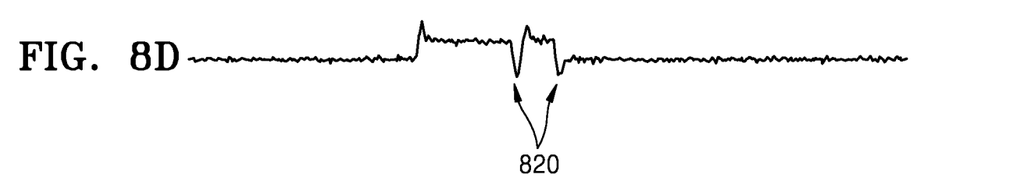

FIGS. 8A, 8B, 8C, 8D, 9A, 9B, 9C, and 9D are diagrams showing results of simulations of peak detections according to bias voltages. As depicted in FIG. 8A, in a state in which a bias voltage Vbias of −154 V is applied to the light detector 122, the light detector 122 outputs a saturated signal 810 as depicted in FIG. 8B. A CFD circuit of the peak detector 130 that receives the saturation signal outputs a signal waveform as depicted in FIG. 8C, and a comparator of the peak detector 130 outputs a signal waveform as depicted in FIG. 8D. The signal waveform of FIG. 8D is output with two falling edges 820, and thus, an error may occur in the processor's 150 determination of a peak time.

Figure 9A:
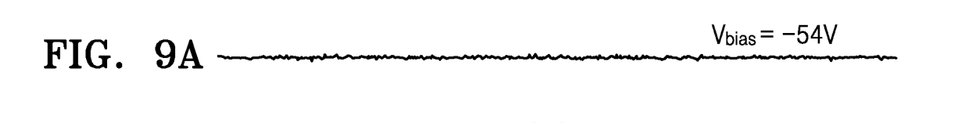
Figure 9B:
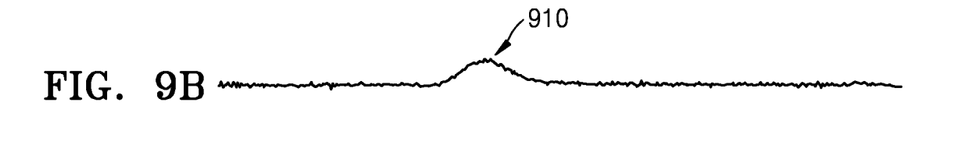
Figure 9C:
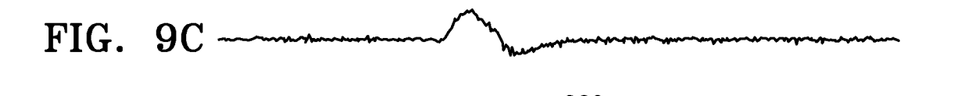
Figure 9D:
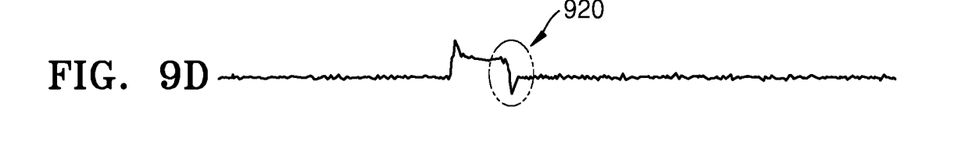

As depicted in FIG. 9A, a controlled bias voltage Vbias of −54 V is applied to the light detector 122. The magnitude of the controlled bias voltage Vbias is about 36% of the magnitude of a bias voltage Vbias before being controlled. As depicted in FIG. 9B, an electrical signal 910 output from the light receiver 120 is not saturated. A CFD circuit of the peak detector 130 outputs a signal waveform as depicted in FIG. 9C, and a comparator of the peak detector 130 outputs a signal waveform as depicted in FIG. 9D. Since the signal waveform depicted in FIG. 9D is output with only one falling edge 920, the processor 150 may correctly determine the peak time.

As described above, since the magnitude of the electrical signal of the light receiver 120 is controlled so that the light receiver 120 outputs an unsaturated signal, an error between a saturated signal and an unsaturated signal may be reduced.

As described above, in order to control the magnitude of an electrical signal of the light receiver 120, the application of a bias voltage to the light detector 122 or a driving signal of the light source 110 is controlled. However, the current exemplary embodiment is not limited thereto. That is, in order to control the magnitude of the electrical signal, the magnitude of a gain with respect to a constituent element, for example, the amplifier 126, may also be controlled.

While exemplary embodiments have been shown and described, it will be understood by those of ordinary skill in the art that various changes in form and details may be made therein without departing from the spirit and scope as defined by the appended claims. The embodiments should be considered in descriptive sense only and not for purposes of limitation. Therefore, the scope is defined by the appended claims, and all differences within the scope will be construed as being included in the inventive concept.

What is claimed is:

1. A distance measuring device comprising:
   a light receiver configured to detect light reflected by an object and to output an electrical signal based on the detected light;
   a peak detector configured to detect a peak from the electrical signal;
   a saturation detector configured to compare the electrical signal with a reference value and thereby detect whether the electrical signal is saturated or not saturated and output a saturation detection result; and
   a processor configured to measure a distance to the object by using the detected peak and to control a magnitude of the electrical signal based on at least one of the detected peak, the saturation detection result, and a measured distance to the object,
   wherein the processor is further configured to increase the magnitude of the electrical signal when no peak is detected by the peak detector for a certain period of time.

2. The distance measuring device of claim 1, wherein the processor is further configured to decrease the magnitude of the electrical signal when the magnitude of the electrical signal is greater than a reference value.

3. The distance measuring device of claim 1, wherein the light receiver comprises a light detector that detects light while a bias voltage is applied thereto.

4. The distance measuring device of claim 3, wherein the processor is further configured to control the magnitude of the electrical signal by controlling the bias voltage.

5. The distance measuring device of claim 4, wherein the magnitude of the electrical signal is proportional to the magnitude of the bias voltage.

6. The distance measuring device of claim 3, wherein the light detector comprises at least one of an avalanche photodiode (APD) and a single-photon avalanche diode (SPAD).

7. The distance measuring device of claim 1, wherein the light receiver further comprises an amplifier that amplifies an amplitude of the electrical signal.

8. The distance measuring device of claim 7, wherein the processor is further configured to control the magnitude of the electrical signal by controlling a gain of the amplifier.

9. The distance measuring device of claim 1, further comprising a light source configured to irradiate light onto the object.

10. The distance measuring device of claim 9, wherein the processor is further configured to control the electrical signal by controlling a driving signal of the light source.

11. The distance measuring device of claim 10, wherein the magnitude of the electrical signal is proportional to a magnitude of the driving signal.

12. The distance measuring device of claim 1, further comprising a light source configured to irradiate light onto the object, wherein the certain period of time is greater than an emission frequency of light of the light source.

13. The distance measuring device of claim 1, wherein the peak detector detects the peak by using a constant fraction discriminator (CFD) method.

14. The distance measuring device of claim 1, wherein the processor is further configured to control the magnitude of the electrical signal in proportion to the measured distance to the object.

15. A method of calculating a distance, the method comprising:
   detecting light reflected by an object;
   outputting an electrical signal based on the detected light reflected;
   comparing the electrical signal with a reference value, detecting whether the electrical signal is saturated or not saturated based on the comparing, and outputting a saturation detection result;
   controlling a magnitude of the electrical signal based on the saturation detection result; and
   calculating a distance to the object based on the electrical signal,
   wherein the controlling magnitude of the electrical signal comprises increasing the magnitude of the electrical signal when a peak is not detected for a certain period of time.

16. The method of claim 15, wherein the controlling the magnitude of the electrical signal comprises decreasing a magnitude of the electrical signal when the magnitude of the electrical signal is greater than the reference value.

17. The method of claim 15, wherein the calculating of the distance comprises:
   calculating the distance to the object by detecting the peak from the electrical signal.

18. The method of claim 15, wherein the controlling the magnitude of the electrical signal comprises controlling a magnitude of a bias voltage applied to a light detector that performs the detecting the light.

19. The method of claim 15, wherein the controlling the magnitude of the electrical signal comprises controlling a magnitude of a driving signal of a light source that emits light.

* * * * *